(12) United States Patent
Fujii

(10) Patent No.: US 8,760,116 B2
(45) Date of Patent: Jun. 24, 2014

(54) CHARGER AND CHARGING SYSTEM

(75) Inventor: Ryo Fujii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 854 days.

(21) Appl. No.: 12/973,920

(22) Filed: Dec. 21, 2010

(65) Prior Publication Data

US 2011/0199047 A1 Aug. 18, 2011

(30) Foreign Application Priority Data

Feb. 12, 2010 (JP) ................................ 2010-028928

(51) Int. Cl.
*H02J 7/00* (2006.01)
(52) U.S. Cl.
USPC .......................................... 320/109; 219/202
(58) Field of Classification Search
USPC ............ 320/109; 219/202, 510, 541; 431/591
See application file for complete search history.

(56) References Cited

U.S. PATENT DOCUMENTS

| | | | | |
|---|---|---|---|---|
| 4,732,562 A | * | 3/1988 | Palsson | 432/224 |
| 4,811,720 A | * | 3/1989 | Katumata et al. | 123/527 |
| 5,791,377 A | * | 8/1998 | LaRochelle | 138/33 |
| 6,727,481 B1 | * | 4/2004 | Wilds | 219/549 |
| 7,991,273 B2 | * | 8/2011 | Sonderegger et al. | 392/478 |
| 8,098,044 B2 | * | 1/2012 | Taguchi | 320/109 |
| 8,151,753 B2 | * | 4/2012 | Kamiyama et al. | 123/142.5 R |
| 2012/0091958 A1 | * | 4/2012 | Ichikawa et al. | 320/109 |
| 2012/0161698 A1 | * | 6/2012 | Anderson | 320/109 |

FOREIGN PATENT DOCUMENTS

JP       2009-089474       4/2009

* cited by examiner

*Primary Examiner* — Edward Tso
*Assistant Examiner* — Ramy Ramadan
(74) *Attorney, Agent, or Firm* — Ditthavong Mori & Steiner, P.C.

(57) ABSTRACT

A charger includes a charging cable and a charging connector. A heater is configured to heat the charging connector using electric power supplied through the charging cable. A state determining device is configured to detect a charge state of a vehicle-mounted battery and to determine whether a heating condition to heat the charging connector is met. A heating controller is configured to control heating performed by the heater based on a determination made by the state determining device. The heater is able to be switched into a post-charge heating state in which the heater heats the charging connector after completion of charging of the vehicle-mounted battery. The heating controller switches the heater into the post-charge heating state and controls heating performed by the heater when the state determining device detects that charging of the vehicle-mounted battery is completed and determines that a heating condition is met.

20 Claims, 15 Drawing Sheets

BACKGROUND ART

CHARGER AND CHARGING SYSTEM

CROSS-REFERENCE TO RELATED APPLICATIONS

The present application claims priority under 35 U.S.C. §119 to Japanese Patent Application No. 2010-028928, filed Feb. 12, 2010, entitled "Charger and Charging System". The contents of this application are incorporated herein by reference in their entirety.

BACKGROUND OF THE INVENTION

1. Field of the Invention

The present invention relates to chargers and charging systems.

2. Description of the Related Art

Of electric vehicles, such as electric cars, which are powered by an electric motor driven by power from a vehicle-mounted battery, those in which a vehicle-mounted battery can be charged by an external power source have been known. In recent years, for widespread use of private electric vehicles, apparatuses have been proposed in which a timer can be set to allow a charger to start charging a vehicle-mounted battery using commercial power at home, and also to allow an air conditioner to start before driving (pre-air-conditioning) (see, e.g., Japanese Unexamined Patent Application Publication No. 2009-089474).

The charger described above is intended for home use and it takes time to charge the vehicle-mounted battery. Therefore, charging of the vehicle-mounted battery will often take place when the user is at home and in particular, for example, during the night when the electric vehicle is not used very often and night-time power can be used. However, when the vehicle-mounted battery is charged during the night, particularly in cold regions or in cold seasons, a charging connector may be frozen as illustrated in FIG. 15. Specifically, as indicated by shading in FIG. 15, a charging connector 201 is frozen while being connected to a charging port 200 of an electric vehicle 202. This may make it difficult to remove the charging connector 201 from the charging port 200.

To prevent such freezing, the charging connector 201 may be internally provided with an electric heater and may allow charging current to pass through the electric heater. However, in the electric vehicle described above, for safety reasons, a connection between an external power source and the vehicle-mounted battery is interrupted after completion of charging, so as to prevent electrical leakage and overcharging. Thus, since no current can pass through the electric heater, the charging connector may be frozen after completion of charging.

SUMMARY OF THE INVENTION

According to one aspect of the present invention, a charger includes a charger main body, a charging cable, a charging connector, a heater, and a heating controller. The charging cable has a first end portion and a second end portion opposite to the first end portion. The first end portion is connected to the charger main body. The charging connector is attached to the second end portion of the charging cable. The charging connector is able to be connected to a receiving port of a vehicle body to charge a vehicle-mounted battery through the charging connector. The heater is configured to heat the charging connector using electric power supplied through the charging cable. The heater is able to be switched into a post-charge heating state in which the heater heats the charging connector after completion of charging of the vehicle-mounted battery. The state determining device is configured to detect a charge state of the vehicle-mounted battery. The state determining device is configured to determine whether a heating condition to heat the charging connector is met. The heating controller is configured to control heating performed by the heater based on a determination made by the state determining device. The heating controller switches the heater into the post-charge heating state and controls heating performed by the heater when the state determining device detects that charging of the vehicle-mounted battery is completed and determines that a heating condition is met.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
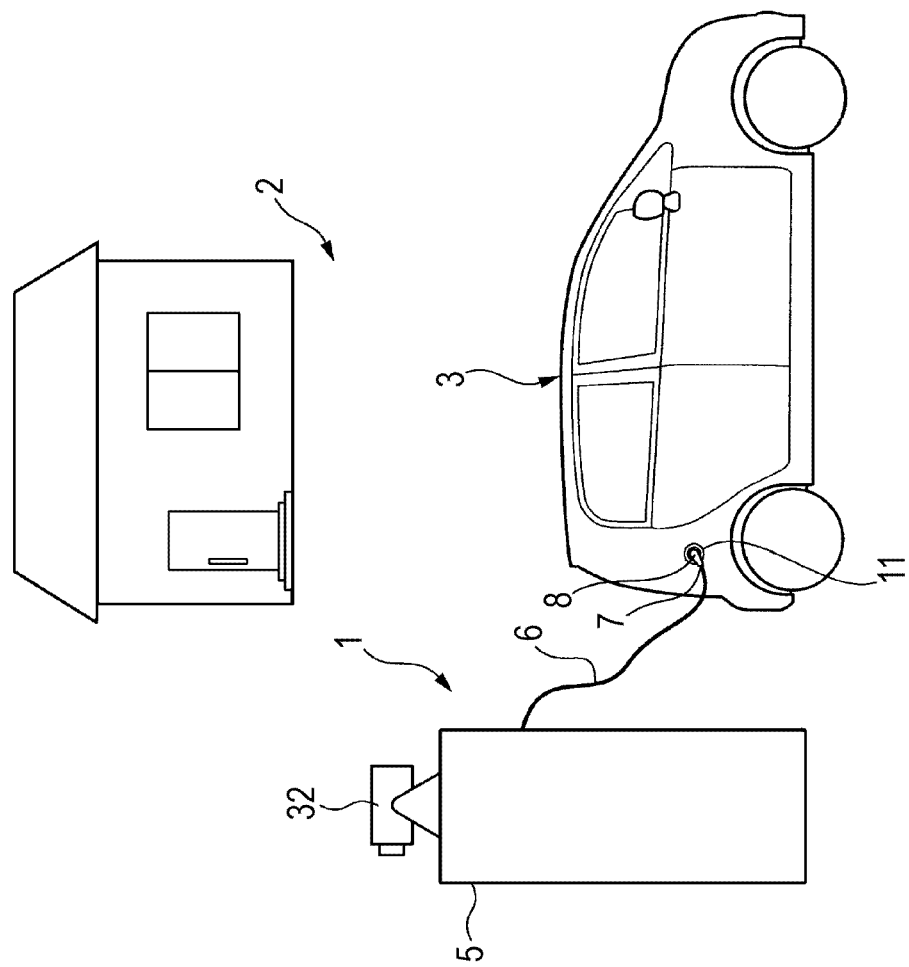
FIG. 1 illustrates a general configuration of a charging system according to a first embodiment of the present invention.

The embodiments will now be described with reference to the accompanying drawings, wherein like reference numerals designate corresponding or identical elements throughout the various drawings.

A charger and a charging system according to a first embodiment of the present invention will now be described with reference to the drawings.

Figure 2:
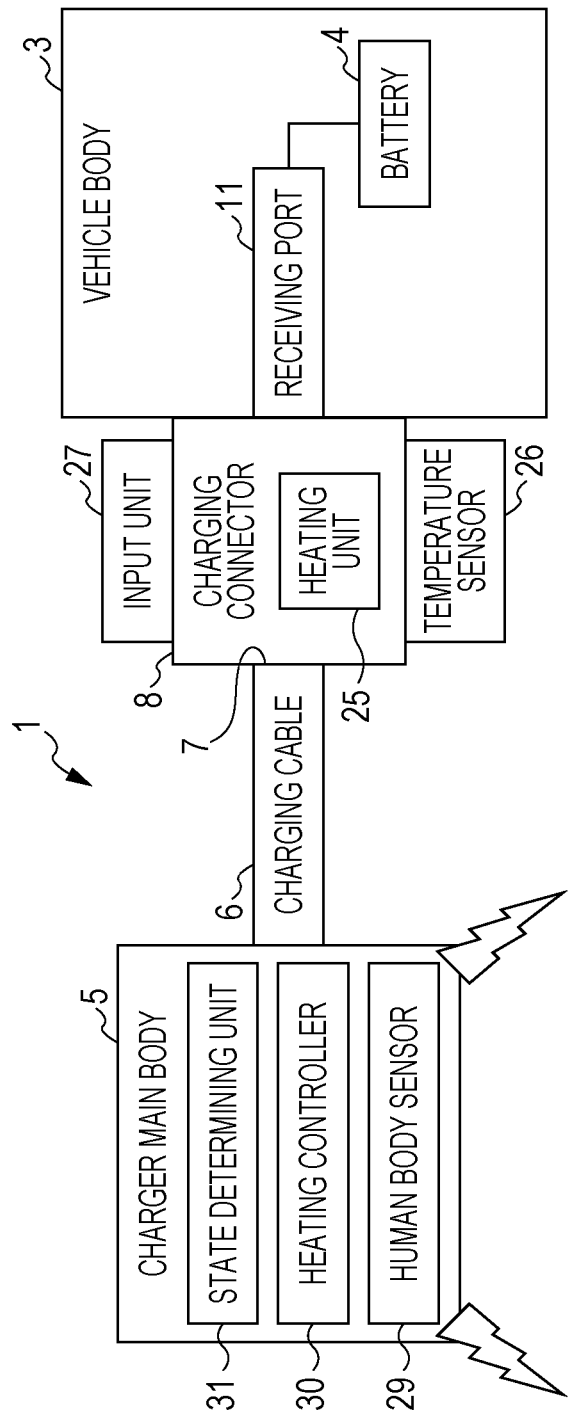
FIG. 2 is a block diagram illustrating a general configuration of a charger and the charging system according to the first embodiment.
Figure 3:
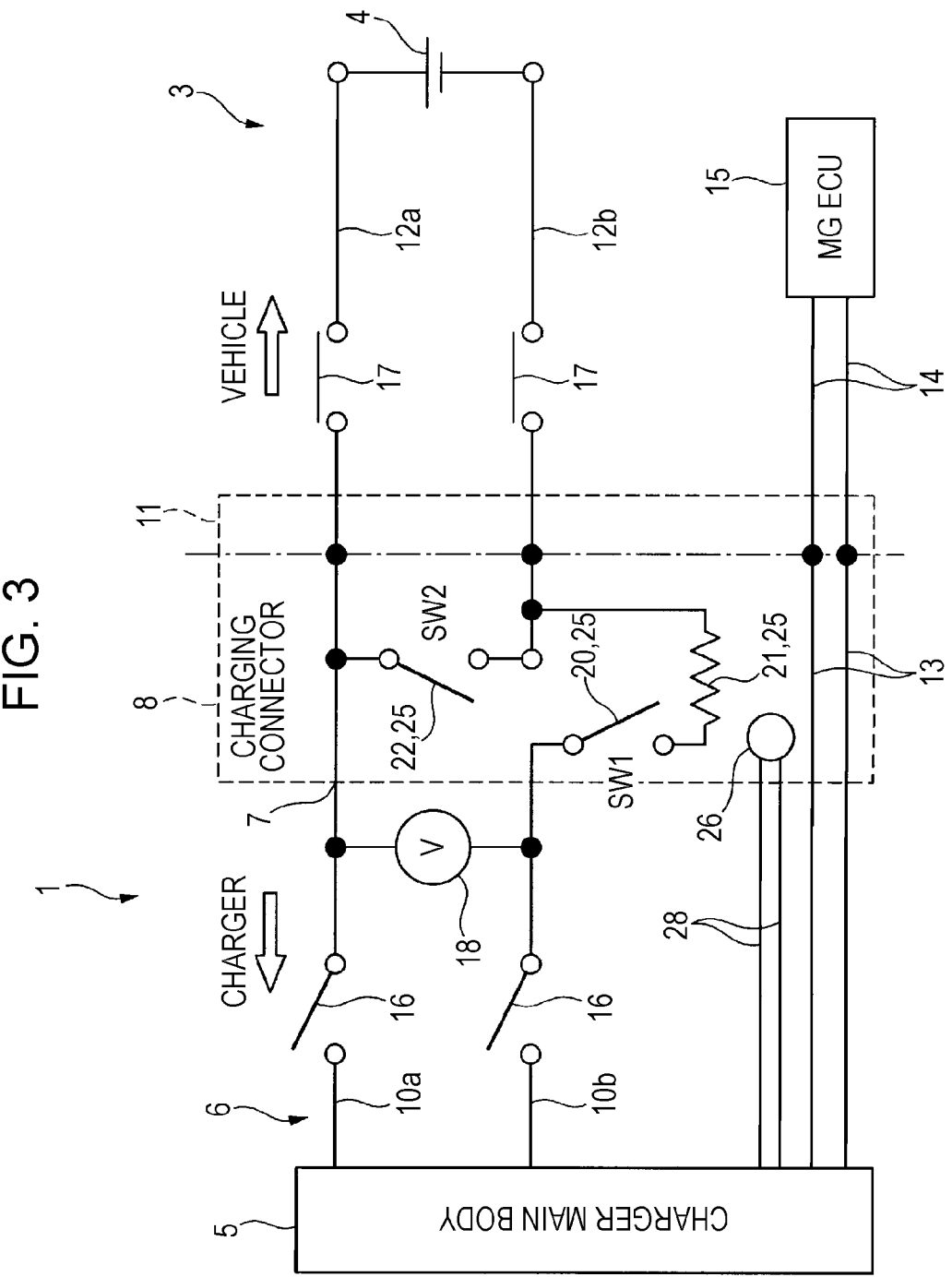
FIG. 3 illustrates a circuit between the charger and a battery according to the first embodiment.

FIG. 1 and FIG. 2 illustrate a general configuration of a charging system 2 including a charger 1 according to the present embodiment. FIG. 3 is a circuit diagram illustrating a general configuration of the charging system 2. The charging system 2 is basically installed and used at a user's home. The charging system 2 includes the charger 1 and an electric vehicle 3.

The charger 1 is placed near a home parking space. The charger 1 uses home electrical power to charge a battery (high-voltage battery) 4 for driving the electric vehicle 3. A charging cable 6 is connected to a charger main body 5 of the charger 1. A charging connector 8 is attached to an end portion 7 of the charging cable 6. The charger 1 includes the charger main body 5, the charging cable 6, and the charging connector 8.

The electric vehicle 3 has a receiving port 11 in its rear side face. The charging connector 8 can be engaged with the receiving port 11 of the electric vehicle 3.

The charging cable 6 connected to the charger main body 5 has a pair of positive and negative charger-side lines 10a and 10b that extends to the charging connector 8. A pair of positive and negative vehicle-side lines 12a and 12b that extends to the receiving port 11 is connected to respective terminals of the battery 4 in the electric vehicle 3. When the charging connector 8 is engaged with the receiving port 11, the positive charger-side line 10a and the positive vehicle-side line 12a are electrically connected to each other, while the negative charger-side line 10b and the negative vehicle-side line 12b are electrically connected to each other.

Pairs of lines 13 and 14 for detecting a state of engagement of the charging connector 8 are connected to the charging connector 8 and the receiving port 11, respectively. The lines 13 connected to the charging connector 8 are connected to the charger main body 5, while the lines 14 connected to the receiving port 11 are connected to a management engine control unit (management ECU or MG ECU) 15. When the charging connector 8 is engaged with the receiving port 11, the lines 13 adjacent to the charger main body 5 and the lines 14 adjacent to the management ECU 15 are electrically connected to each other and thus, the charger main body 5 and the management ECU 15 are connected to each other. This allows a state determining unit 31 (described below) in the charger main body 5 to detect that the charging connector 8 has been engaged with the receiving port 11. Note that the management ECU 15 is a control device that manages charging and discharging of the battery 4.

Electromagnetic contactors 16 and 17 that interrupt the circuit are disposed in the charger-side lines 10a and 10b and the vehicle-side lines 12a and 12b. A voltmeter 18 is connected between the charger-side lines 10a and 10b. In FIG. 3, the voltmeter 18 is shown between the charger main body 5 and the charging connector 8 for convenience of illustration. However, the voltmeter 18 may be disposed either inside the charger main body 5 or inside the charging connector 8.

The charging connector 8 is internally provided with a single-pole triple-throw first electromagnetic switch 20 (SW1) disposed in the negative charger-side line 10b. The first electromagnetic switch 20 can switch between three different states: a state in which it is connected to the negative vehicle-side line 12b, a state in which it is connected via a heat generating unit 21 to the negative vehicle-side line 12b, and a state in which it is not connected to anything.

A single-pole single-throw second electromagnetic switch 22 (SW2), such as a solid-state relay, is connected between the positive charger-side line 10a and the negative charger-side line 10b. The second electromagnetic switch 22 is closer to the receiving port 11 than the first electromagnetic switch 20 is to the receiving port 11. The second electromagnetic switch 22 functions as a bypass switch that short-circuits the charger-side lines 10a and 10b in the charging connector 8. The single-pole triple-throw first electromagnetic switch 20 may be replaced with two single-pole single-throw electromagnetic switches connected in a branched manner.

The charging connector 8 includes a heating unit 25, a temperature sensor 26, and an input unit 27 that are integral with each other.

The heating unit 25 heats primarily the periphery of the charging connector 8 to thaw a frozen portion of the charging connector 8. The heating unit 25 includes the heat generating unit 21 (e.g., heating wire) that generates heat using electric power from the charging cable 6, and the first electromagnetic switch 20 and the second electromagnetic switch 22 that switch the circuit to allow current to pass through the heat generating unit 21. The switching states of the first electromagnetic switch 20 and the second electromagnetic switch 22 are controlled by a heating controller 30. The heating unit 25 can be switched between the following states: a mid-charge heating state in which it performs heating during charging of the battery 4, and a post-charge heating state in which it performs heating after completion of charging of the battery 4.

The temperature sensor 26, such as a thermistor, is disposed near the periphery of the charging connector 8. The temperature sensor 26 is connected to the charger main body 5 through dedicated signal lines 28 routed along the charging cable 6. Temperature information from the temperature sensor 26 is input through the signal lines 28 to the charger main body 5.

The input unit 27 is used to input an instruction indicating when the heating unit 25 should start heating. The input unit 27 is configured to allow a user to set a timer that measures time until the start of heating. Information input to the input unit 27 is transmitted to the charger main body 5 by power line communication through the charging cable 6 or by wireless communication.

The charger main body 5 includes a human body sensor 29, the heating controller 30, and the state determining unit 31.

The human body sensor 29 detects a human body that is present around the charger main body 5. The human body sensor 29 includes a camera 32 (see FIG. 1) that captures images of the surroundings of the charger main body 5. The camera 32 is turnably mounted in a place where it can capture images of the surroundings of the charger main body 5, such as at the top of the charger main body 5. The human body sensor 29 processes an image captured by the camera 32, determines whether there is a human body, and outputs a result of the determination to the state determining unit 31. Thus, a user who approaches the charger main body 5 is detected by the human body sensor 29.

The state determining unit 31 determines a state of engagement of the charging connector 8 with the receiving port 11, and determines a charge state of the battery 4, such as whether charging is in progress or completed. Specifically, such a charge state of the battery 4 is determined based on a current value of current flowing through the charging cable 6 and a line voltage (measured by the voltmeter 18) of the charging cable 6. The current value and the line voltage are monitored inside the charger main body 5. The state determining unit 31 outputs a result of the determination of the charge state to the heating controller 30.

The state determining unit 31 further determines whether a heating condition for heating the charging connector 8 is met. Specifically, the state determining unit 31 determines whether a result of detection made by the temperature sensor 26, a result of detection made by the human body sensor 29, and an operational input from the input unit 27 meet a heating condition for heating the charging connector 8. The phrase "a heating condition for heating the charging connector 8 is met" means that at least one of the following conditions input to the state determining unit 31 meets a corresponding predetermined condition: a temperature near the periphery of the charging connector 8, the presence or absence of a human body around the charger main body 5, and whether there is a heating instruction input. The state determining unit 31 outputs, to the heating controller 30, information about a charge state and information about whether a heating condition is met.

Based on the above-described information input from the state determining unit 31, the heating controller 30 switches a state of the heating unit 25 and performs heating control. Specifically, the heating controller 30 controls switching of the first and second electromagnetic switches 20 and 22 of the heating unit 25 and the electromagnetic contactors 16 in the charger 1. If charging is in progress, the heating controller 30 switches the heating unit 25 into the mid-charge heating state and starts heating control. If charging is completed, that is, if the battery 4 is in a fully charged state, the heating controller 30 switches the heating unit 25 into the post-charge heating state and starts heating control. Regardless of whether charging is in progress or completed, if the timer has been set through the input unit 27, the heating controller 30 measures time based on a time set by an operational input on the timer. When the time set on the timer has been reached, the heating controller 30 starts to control heating performed by the heating unit 25.

Switching of the electromagnetic contactors 17 disposed in the vehicle-side lines 12a and 12b of the charging cable 6 is controlled by a control device (e.g., MG_ECU) in the electric vehicle 3. When completion of charging is detected based on a terminal voltage of the battery 4, the control device in the electric vehicle 3 opens the electromagnetic contactors 17 to prevent overcharging and electrical leakage. The electromagnetic contactors 16 disposed in the charger-side lines 10a and 10b are located inside the charger main body 5 or inside the charging connector 8. The electromagnetic contactors 16 are closed by the heating controller 30 only when charging is in progress and heating is necessary. Note that for convenience of illustration in FIG. 3, the electromagnetic contactors 16 are shown between the charger main body 5 and the charging connector 8.

The charger 1 and the charging system 2 of the present embodiment are configured as described above. Next, the operation of the charger 1 and the charging system 2 will be described with reference to flowcharts.

Figure 4:
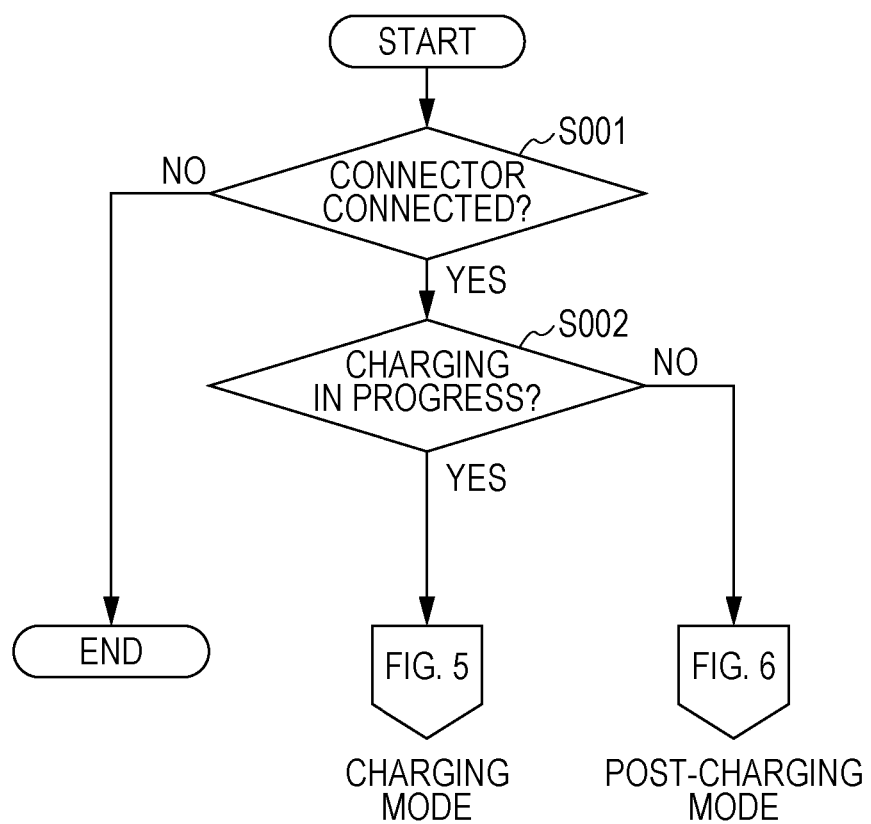
FIG. 4 is a flowchart illustrating an operation of the charging system according to the first embodiment.

Referring to FIG. 4, based on a result of detection made by the state determining unit 31 of the charger main body 5, a determination is made as to whether the charging connector 8 has been connected to the receiving port 11 of the electric vehicle 3 (step S001). If the charging connector 8 has not been connected to the receiving port 11 (NO in step S001), this control process is stopped. On the other hand, if it is detected that the charging connector 8 has been connected to the receiving port 11 (YES in step S001), a determination is made, based on a result of detection made by the state determining unit 31, as to whether charging of the battery 4 is in progress (step S002). If charging is not in progress (NO in step S002), a post-charging mode is entered (see the flowchart of FIG. 6). If charging is in progress (YES in step S002), a charging mode is entered (see the flowchart of FIG. 5).

Figure 5:
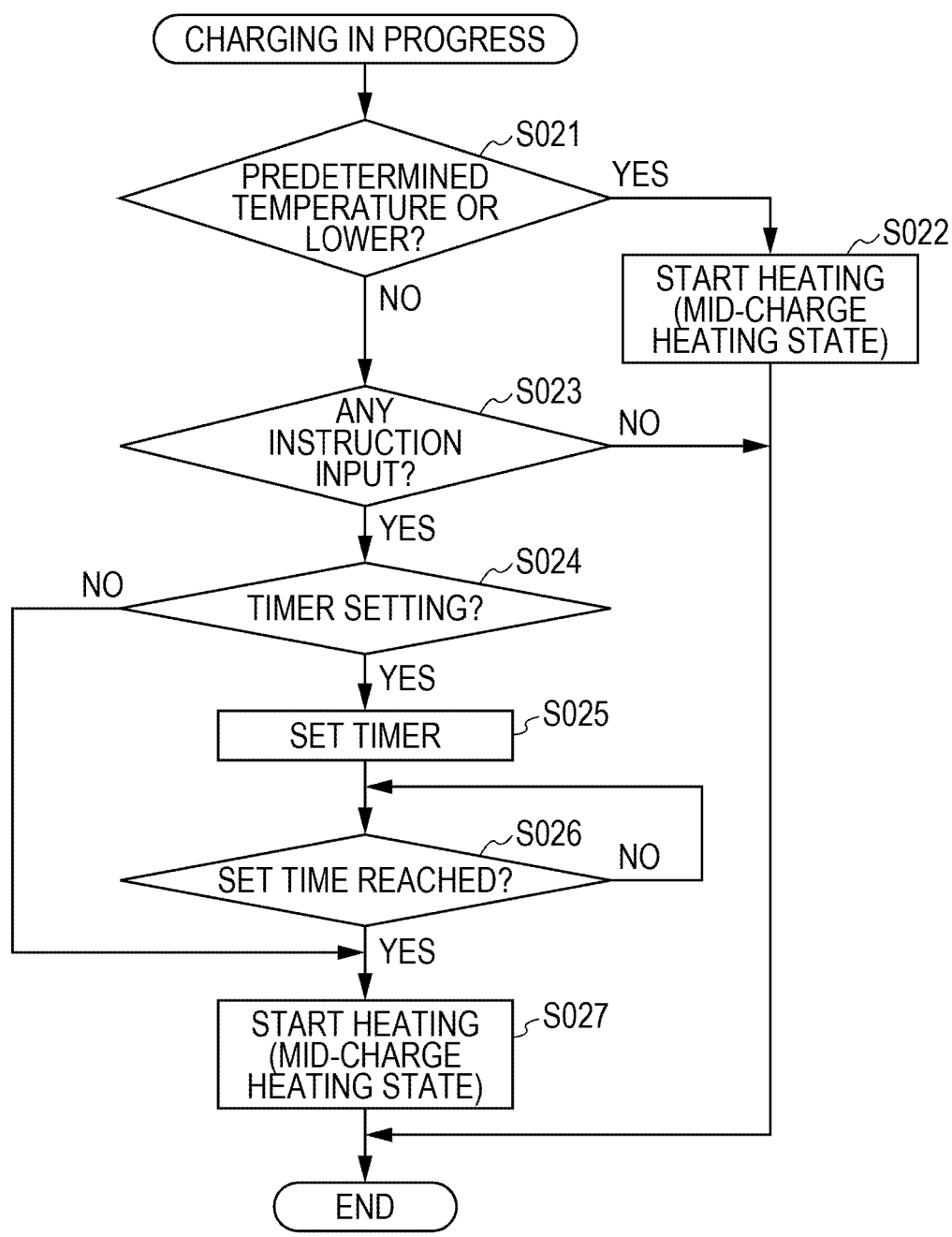
FIG. 5 is a flowchart illustrating an operation in a charging mode according to the first embodiment.

When the charging mode is entered, the process proceeds to that of FIG. 5. First, for the state determining unit 31 to determine whether a heating condition is met, a determination is made as to whether a temperature detected near the periphery of the charging connector 8 by the temperature sensor 26 is lower than or equal to a predetermined temperature (step S021). If the temperature detected near the periphery of the charging connector 8 is lower than or equal to the predetermined temperature (YES in step S021), the heating controller 30 switches the heating unit 25 into the mid-charge heating state and starts heating control (step S022). Then, this series of control processes is stopped. Note that the predetermined temperature is any predetermined temperature and is preferably, for example, a below-freezing temperature at which the charging connector 8 is frozen while being connected to the receiving port 11.

If the temperature detected near the periphery of the charging connector 8 by the temperature sensor 26 is higher than the predetermined temperature (NO in step S021), a determination is made as to whether there is an operational input of a heating instruction (hereinafter referred to as an instruction input) from the input unit 27 (step S023). If it is determined that there is no instruction input (NO in step S023), this series of control processes is stopped. If it is determined that there is an instruction input (YES in step S023), a determination is made as to whether there is an operational input for setting the timer (i.e., whether to set the timer) (step S024). If there is no operational input for setting the timer (NO in step S024), the heating controller 30 switches the heating unit 25 into the mid-charge heating state and starts heating control (step S027). Then, this series of control processes is stopped. On the other hand, if there is an operational input for setting the timer (i.e., if the timer is to be set) (YES in step S024), the timer is set (step S025) and a determination is made as to whether the time set on the timer has been reached (step S026). If the set time has been reached (YES in step S026), the heating controller 30 switches the heating unit 25 into the mid-charge heating state and starts heating control (step S027). Then, this series of control processes is stopped.

Figure 7:
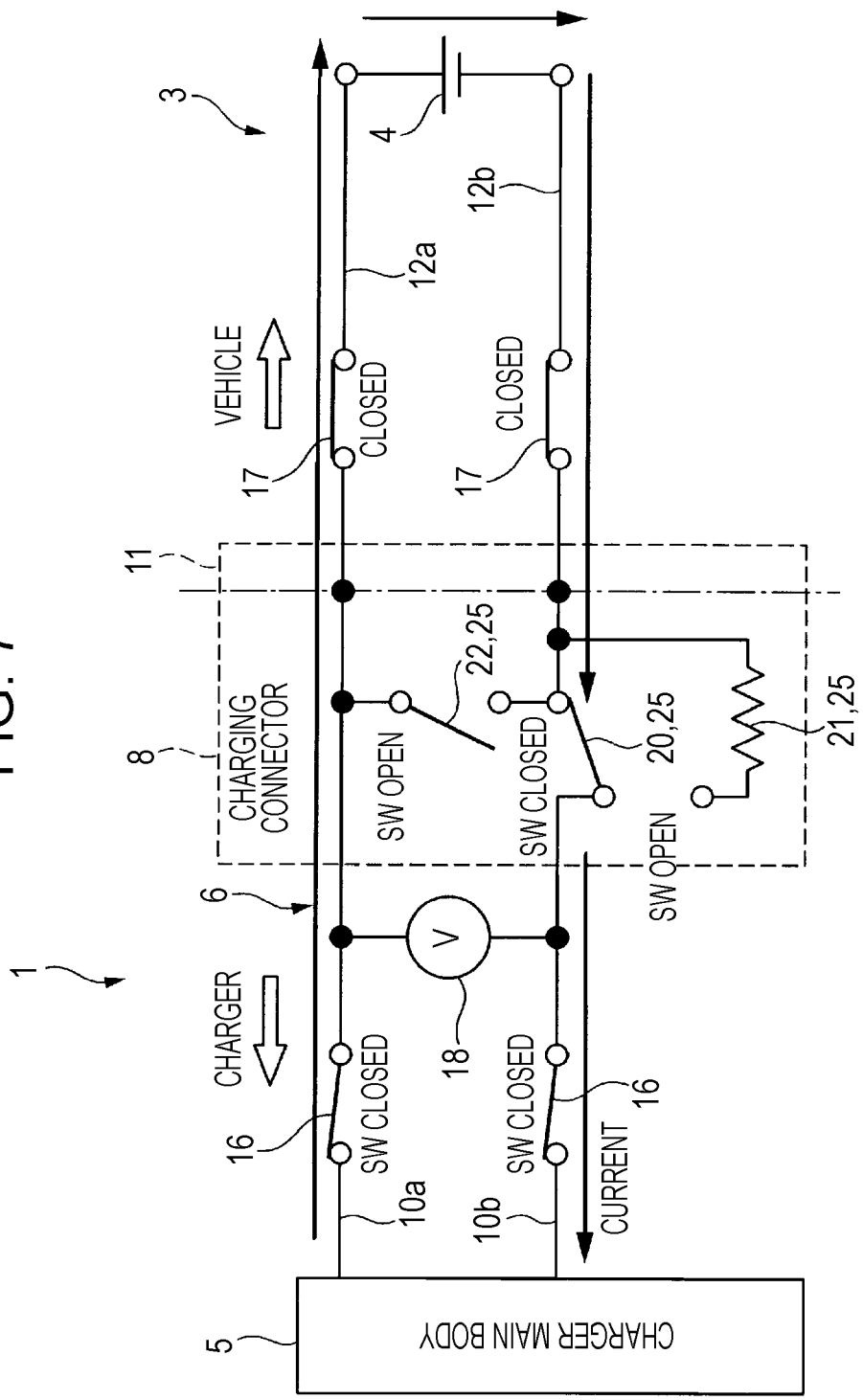
FIG. 7 illustrates a circuit state during battery charging according to the first embodiment.
Figure 8:
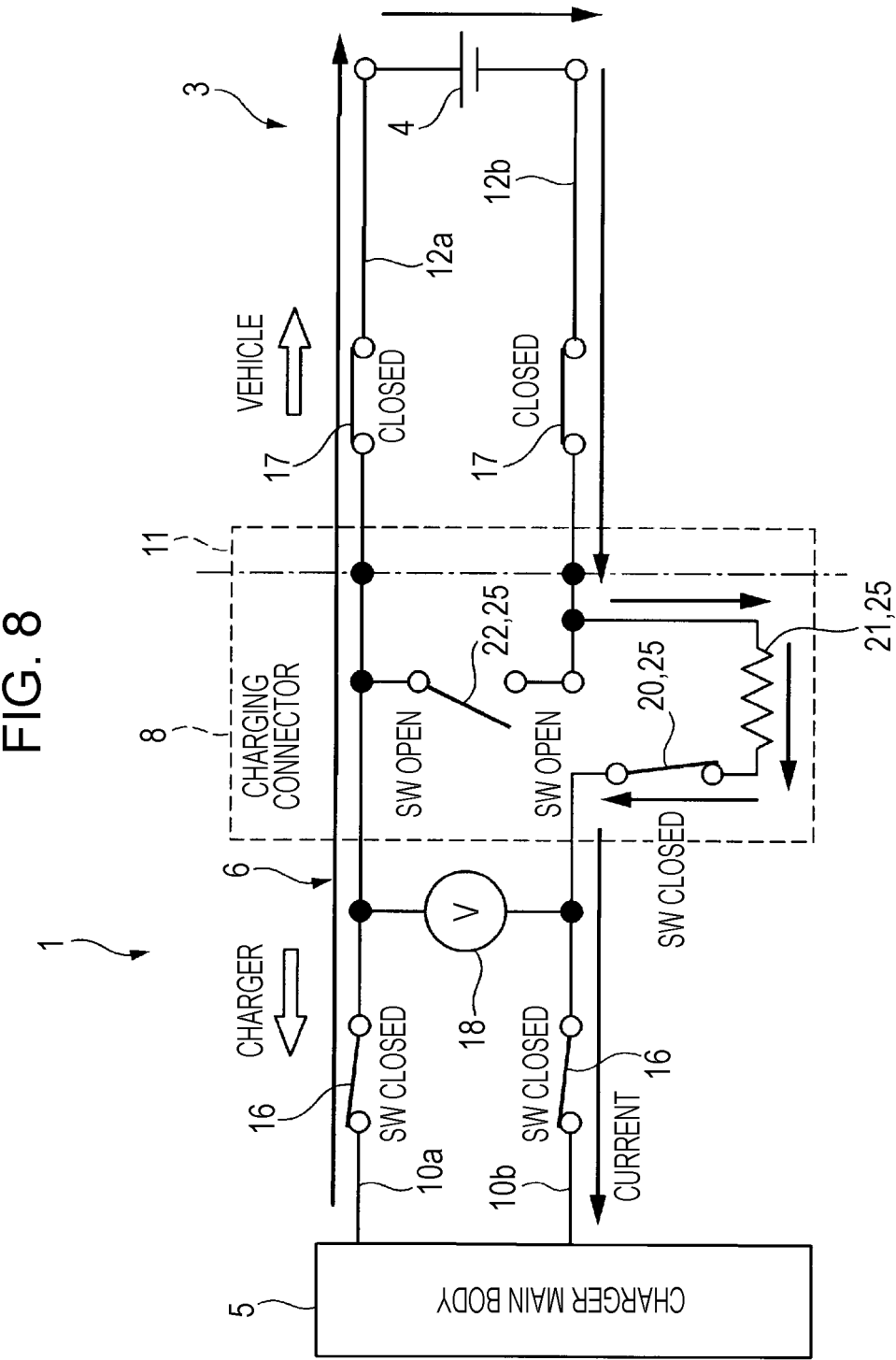
FIG. 8 illustrates a circuit state in which a heating unit is in a mid-charge heating state according to the first embodiment.

FIG. 7 illustrates a circuit state during charging of the battery 4. During charging, for supplying electric power for charging to the battery 4, both the electromagnetic contactors 16 on the charger side and the electromagnetic contactors 17 on the vehicle side are closed. Additionally, the first electromagnetic switch 20 is closed to bypass the heating unit 25, and the second electromagnetic switch 22 is turned OFF. Then, when the mid-charge heating state is entered, as illustrated in FIG. 8, the first electromagnetic switch 20 is connected to the circuit on the side of the heating unit 25 while the electromagnetic contactors 16 and 17 in the charger-side lines 10a and 10b and the vehicle-side lines 12a and 12b are kept closed and the second electromagnetic switch 22 is kept in the OFF state. This forms a closed circuit that extends from the positive charger-side line 10a through the positive vehicle-side line 12a to reach the positive terminal of the battery 4, and further extends from the negative vehicle-side line 12b connected to the negative terminal of the battery 4 through the heat generating unit 21 and the negative charger-side line 10b to reach the charger main body 5. Therefore, it is possible, during charging of the battery 4, to allow current to flow through the charging cable 6 to the heat generating unit 21 to heat the charging connector 8.

Figure 6:
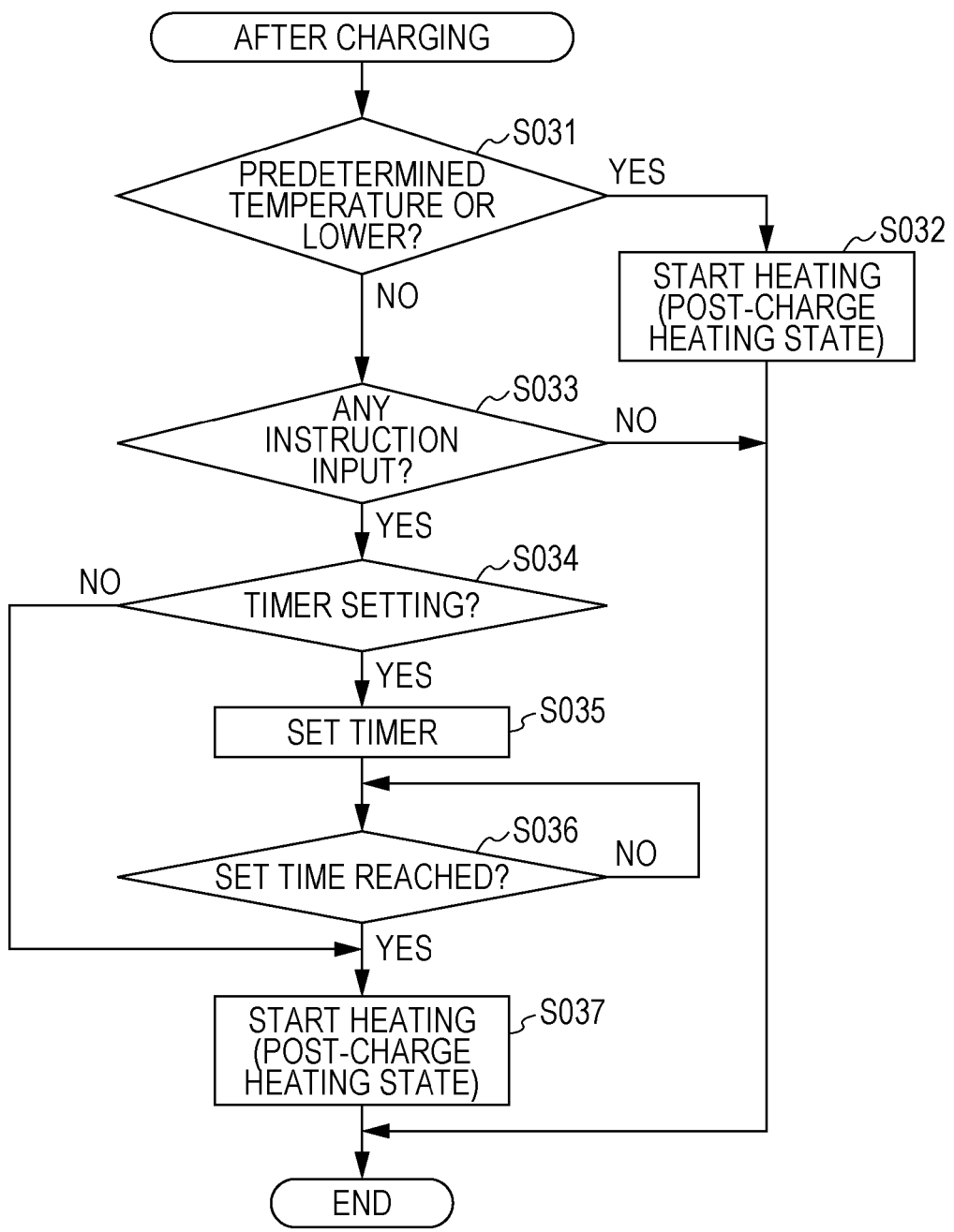
FIG. 6 is a flowchart illustrating an operation in a post-charging mode according to the first embodiment.

On the other hand, when the post-charging mode is entered (see FIG. 4), the process proceeds to that of FIG. 6. First, for the state determining unit 31 to determine whether a heating condition is met, a determination is made as to whether a temperature detected near the periphery of the charging connector 8 by the temperature sensor 26 is lower than or equal to a predetermined temperature (step S031). If the temperature detected near the periphery of the charging connector 8 is lower than or equal to the predetermined temperature (YES in step S031), the heating controller 30 switches the heating unit 25 into the post-charge heating state and starts heating control (step S032). Then, this series of control processes is stopped.

If the temperature detected near the periphery of the charging connector 8 by the temperature sensor 26 is higher than the predetermined temperature (NO in step S031), a determination is made as to whether there is an instruction input from the input unit 27 (step S033). If it is determined that there is no instruction input (NO in step S033), this series of control processes is stopped. If it is determined that there is an instruction input (YES in step S033), a determination is made as to whether there is an operational input for setting the timer (i.e., whether to set the timer) (step S034). If there is no operational input for setting the timer (NO in step S034), the heating controller 30 switches the heating unit 25 into the post-charge heating state and starts heating control (step S037). Then, this series of control processes is stopped. On the other hand, if there is an operational input for setting the timer (i.e., if the timer is to be set) (YES in step S034), the timer is set (step S035) and a determination is made as to whether the time set on the timer has been reached (step S036). If the set time has been reached (YES in step S036), the heating controller 30 switches the heating unit 25 into the post-charge heating state and starts heating control (step S037). Then, this series of control processes is stopped.

Figure 9:
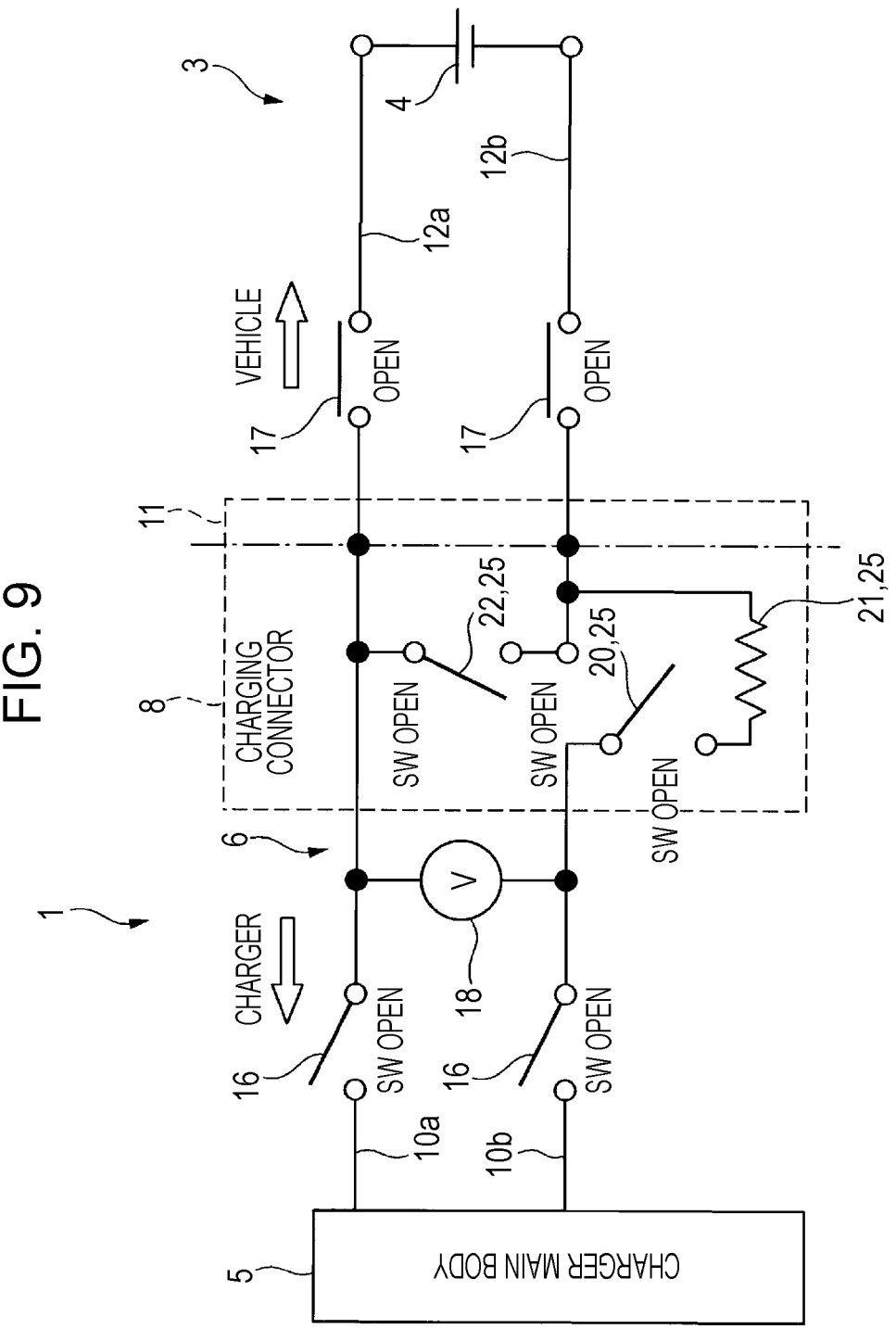
FIG. 9 illustrates a circuit state in which the battery is in a fully charged state according to the first embodiment.
Figure 10:
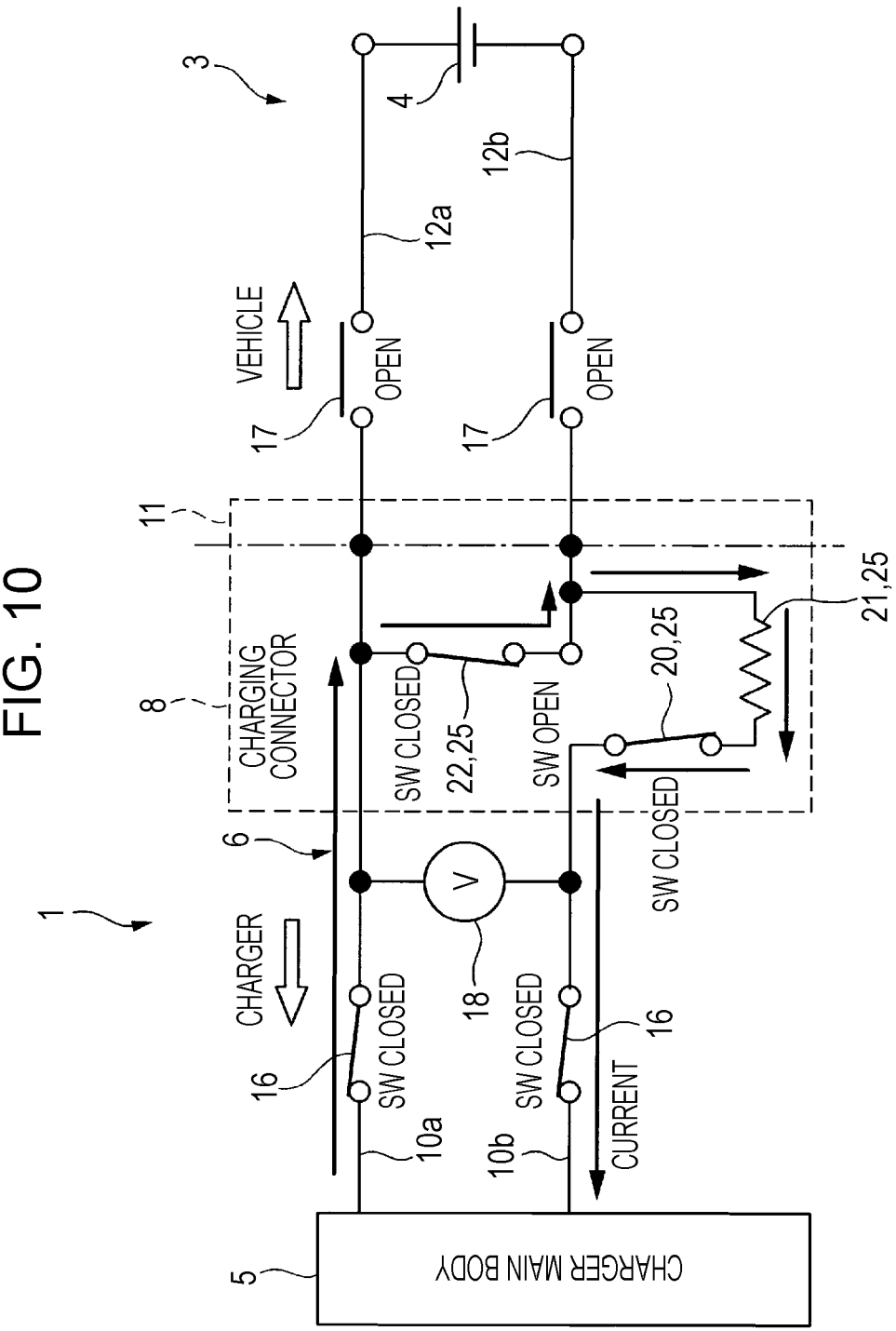
FIG. 10 illustrates a circuit state in which the heating unit is in a post-charge heating state according to the first embodiment.

FIG. 9 illustrates a circuit state after completion of charging, that is, a circuit state in which the battery 4 is in a fully charged state. After completion of charging, for prevention of electrical leakage and overcharging, both the electromagnetic contactors 16 on the charger side and the electromagnetic contactors 17 on the vehicle side are opened, and both the first electromagnetic switch 20 and the second electromagnetic switch 22 are turned OFF. Then, when the post-charge heating state is entered, as illustrated in FIG. 10, the electromagnetic contactors 16 on the charger side are closed, the first electromagnetic switch 20 is connected to the circuit on the side of the heat generating unit 21, and the second electromagnetic switch 22 is turned ON. This forms a closed circuit that extends from the positive charger-side line 10a through the second electromagnetic switch 22, the heat generating unit 21, and the first electromagnetic switch 20 to the negative charger-side line 10b. Thus, current can be passed through the charging cable 6 to the heat generating unit 21.

In the charger 1 and the charging system 2 of the first embodiment, the charging connector 8 is connected to the receiving port 11 of the electric vehicle 3 and charging of the battery 4 starts. Then, upon completion of the charging, the connection between the receiving port 11 and the battery 4 is interrupted by the electromagnetic contactors 17 and the flow of current is stopped. However, when the state determining unit 31 detects the completion of charging of the battery 4 and determines that a heating condition is met (i.e., determines that there is an instruction input from the input unit 27 or that a temperature near the periphery of the charging connector 8 is lower than or equal to a predetermined temperature), the heating controller 30 switches the heating unit 25 for heating the charging connector 8 into the post-charge heating state and performs heating control. Even when an electrical connection between the receiving port 11 of the electric vehicle 3 and the battery 4 is interrupted after completion of charging, the heating unit 25 is switched into the post-charge heating state and can heat the charging connector 8. Therefore, it is possible to prevent freezing of the charging connector 8 while preventing electrical leakage and overcharging of the battery 4, and thus the charging connector 8 can be smoothly removed from the receiving port 11.

When there is an instruction input from a user through the input unit 27, the state determining unit 31 determines that a heating condition is met and the charging connector 8 is heated by the heating unit 25 in the post-charge heating state. Since it is thus possible to heat the charging connector 8 at any desired time after completion of charging, user convenience can be improved.

Additionally, since the temperature sensor 26 detects a temperature near the periphery of the charging connector 8, it is possible to accurately determine the likelihood of freezing of the charging connector 8, and to reduce excess energy consumption.

When a user approaching the charger main body 5 to get into the electric vehicle 3 is detected by the human body sensor 29, a heating condition is met and the charging connector 8 in a frozen state is heated and thawed. It is thus possible to reduce heating time and prevent unnecessary heating.

When a heating condition is met during charging of the battery 4, the heating unit 25 can be switched into the mid-charge heating state and can heat the charging connector 8. Thus, regardless of whether charging is in progress or completed, it is possible to heat the charging connector 8 when a heating condition is met.

Next, a charger 101 and a charging system 102 including the charger 101 according to a second embodiment of the present invention will be described with reference to FIG. 11 and FIG. 12.

In the charger 101 and the charging system 102 of the second embodiment, a house state detector 40 that detects a state of a house and an identification (ID) card 41 are provided, instead of the human body sensor 29 described in the first embodiment. Note that identical parts are designated by the same reference numerals and overlapping description will be omitted.

Figure 11:
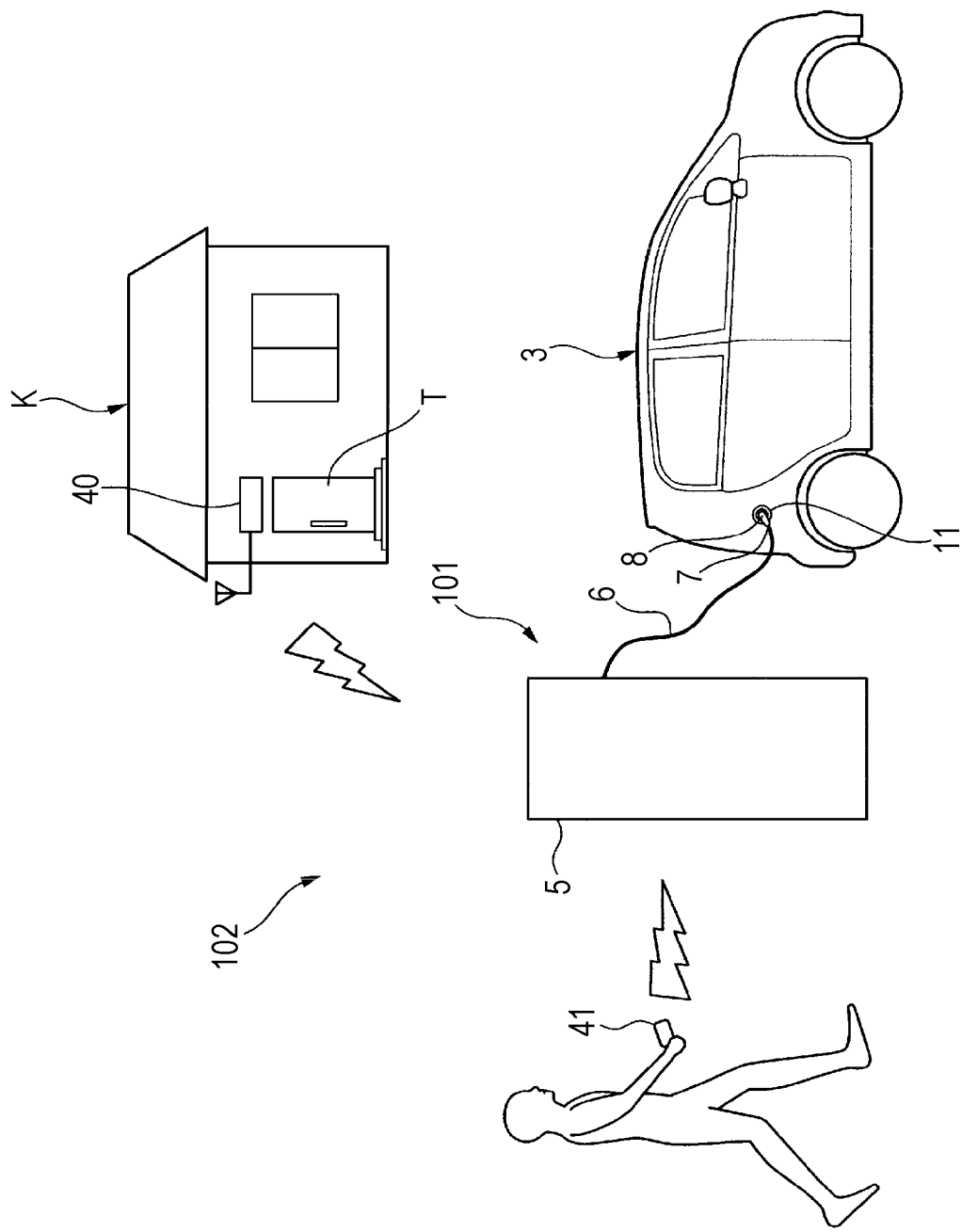
FIG. 11 corresponds to FIG. 1 and illustrates a general configuration of a charging system according to a second embodiment of the present invention.
Figure 12:
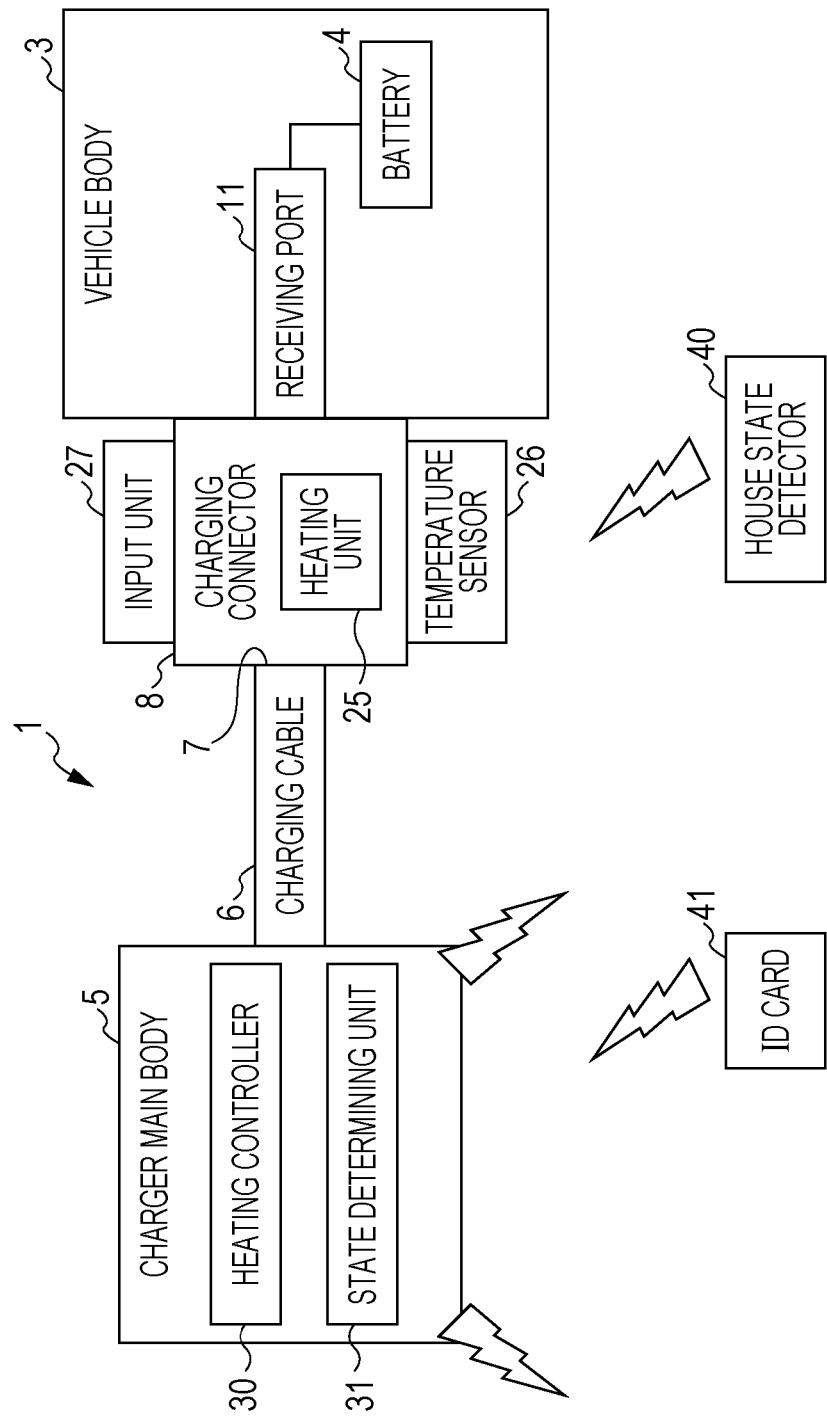
FIG. 12 is a block diagram corresponding to FIG. 2 and illustrating a general configuration of a charger and the charging system according to the second embodiment.

FIG. 11 and FIG. 12 illustrate a general configuration of the charging system 102 according to the present embodiment.

The ID card 41 is a mobile terminal capable of wirelessly transmitting identification information to the charger main body 5 and to the electric vehicle 3. For example, the ID card 41 is a wireless terminal used in a keyless entry system which allows a user to lock and unlock a vehicle door without using a mechanical key, and also used in a smart key system which allows a user to turn ON the power of an electric vehicle without using a mechanical key. That is, when a user with the ID card 41 approaches the charger main body 5, user information is transmitted to the state determining unit 31 of the charger main body 5.

The house state detector 40 detects that the user has stepped outside by detecting the opening and closing of a front door T of a house K. The house state detector 40 transmits a result of this detection to the state determining unit 31 of the charger main body 5, for example, through wireless communication. As long as it is possible to detect that the user has stepped outside, the house state detector 40 may be configured to detect, for example, the lighting-up of a light in the early morning, instead of the opening and closing of the front door T, and transmit a result of the detection.

The state determining unit 31 determines whether a heating condition is met on the basis not only of the information described in the first embodiment, but also of user information received from the ID card 41 or a result of detection made by the house state detector 40. Specifically, if user information is received from the ID card 41 and the received user information matches predetermined information about the user of the electric vehicle 3, the user is likely to be present near the charger main body 5 and will remove the charging connector 8 to use the electric vehicle 3. Therefore, the state determining unit 31 determines that a heating condition for heating the heating unit 25 is met. Then, as in the case of the first embodiment described above, the heating controller 30 starts to control heating performed by the heating unit 25 in accordance with the charge state of the battery 4.

Similarly, when the house state detector 40 detects the opening and closing of the front door T, the state determining unit 31 predicts that the user will step out of the house K and will remove the charging connector 8 to use the electric vehicle 3. The state determining unit 31 thus determines that a heating condition for heating the heating unit 25 is met. Then, the heating controller 30 starts to control heating performed by the heating unit 25. A determination, based on information received from the ID card 41 or the house state detector 40, as to whether a heating condition is met may be made just once in the morning using a clock function.

In the second embodiment described above, user actions are predicted based on user information received from the ID card 41 or house state information received from the house state detector 40. Then, when the user or house state meets a predetermined condition, the state determining unit 31 determines that a heating condition is met. Since the charging connector 8 can thus be heated in accordance with user actions, it is possible to improve user convenience while reducing unnecessary heating.

Also, the state determining unit 31 can determine, based on user information output from the ID card 41, whether a person with the ID card 41 is the user of the electric vehicle 3 to which the charging connector 8 is connected. The charging connector 8 can thus be heated when the user of the electric vehicle 3 uses the electric vehicle 3. At the same time, it is possible to prevent unnecessary heating that may occur when user information input is not information about the user of the electric vehicle 3.

Additionally, when a house door is opened, it is possible to predict that the user will step out of the house. Thus, the charging connector 8 can be heated until the user reaches the vehicle, and can be smoothly removed from the receiving port 11.

Other Embodiments

In the first embodiment described above, a determination as to whether a heating condition is met is made by the state determining unit 31 based on a result of detection made by the temperature sensor 26 and an instruction input from the input unit 27. Alternatively, such a determination can be made based on at least one of a result of detection made by the temperature sensor 26 and an instruction input from the input unit 27. Hereinafter, as other embodiments, control processes in two different embodiments will be described with reference to flowcharts. Note, in the following description, that parts identical to those in the above-described embodiments are designated by the same reference numerals.

Figure 13:
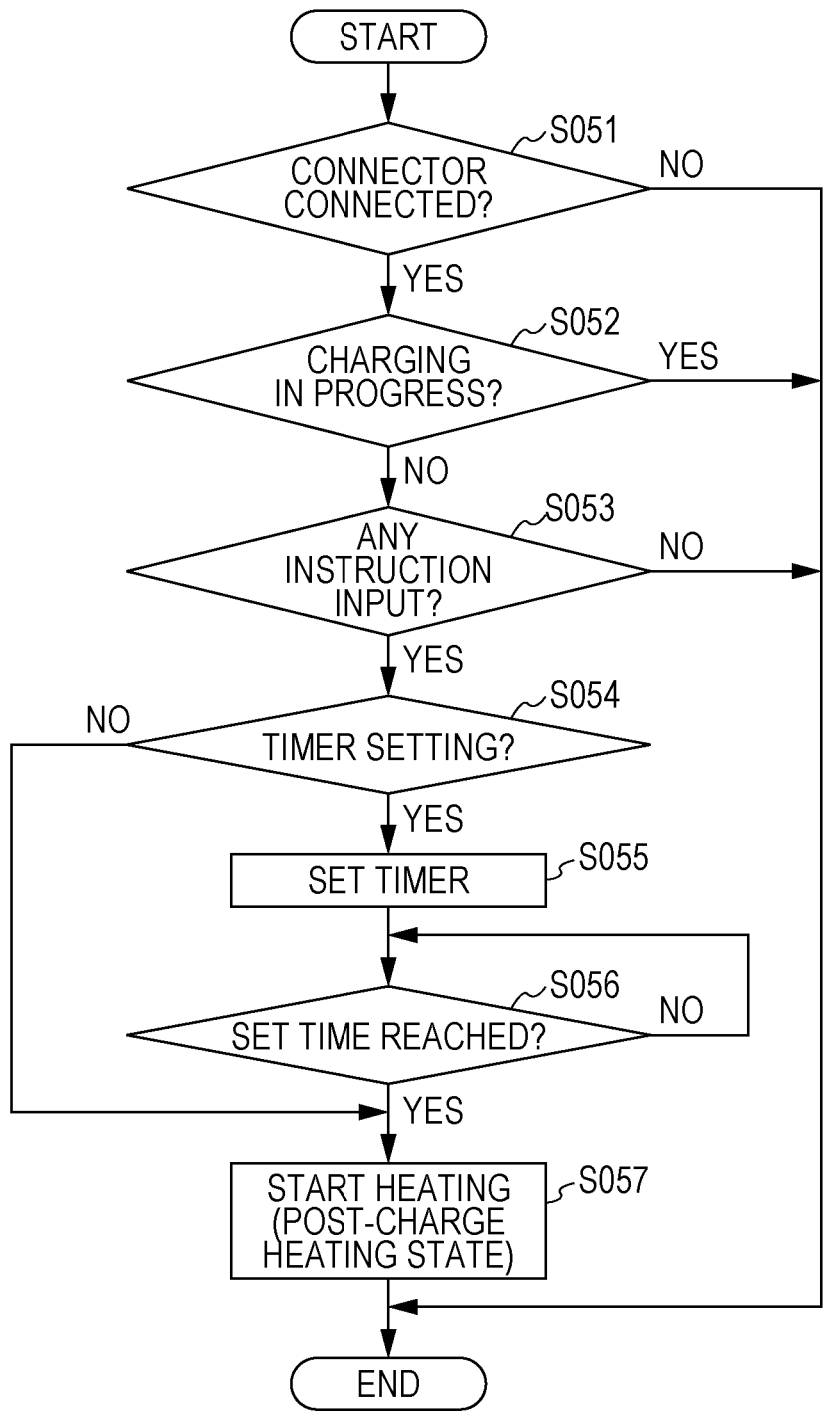
FIG. 13 is a flowchart illustrating an operation in which whether a heating condition is met is determined on the basis only of an instruction input, according to another embodiment of the present invention.

FIG. 13 is a flowchart illustrating a process in which whether a heating condition is met is determined on the basis only of an instruction input from the input unit 27. That is, the embodiment illustrated in FIG. 13 is one in which the human body sensor 29 and the temperature sensor 26 described in the first embodiment are omitted.

First, based on a result of detection made by the state determining unit 31 of the charger main body 5, a determination is made as to whether the charging connector 8 has been connected to (or engaged with) the receiving port 11 of the electric vehicle 3 (step S051). If the charging connector 8 has not been connected to the receiving port 11 (NO in step S051), this control process is stopped. On the other hand, if it is detected that the charging connector 8 has been connected to the receiving port 11 (YES in step S051), a determination is made, based on a result of detection made by the state determining unit 31, as to whether charging of the battery 4 is in progress (step S052). If it is determined that charging is in progress (YES in step S052), this control process is stopped. Note that if charging is in progress, the heating unit 25 is switched into the mid-charge heating state and heats the charging connector 8.

On the other hand, if charging is not in progress (NO in step S052), a determination is made as to whether there is an instruction input from the input unit 27 (step S053). If it is determined that there is no instruction input (NO in step S053), this control process is stopped. If it is determined that there is an instruction input (YES in step S053), a determination is made as to whether there is an operational input for setting the timer (i.e., whether to set the timer) (step S054). If there is no operational input for setting the timer (NO in step S054), the heating controller 30 switches the heating unit 25 into the post-charge heating state and starts heating control (step S057). Then, this control process is stopped. On the other hand, if there is an operational input for setting the timer (YES in step S054), the timer is set (step S055) and a determination is made as to whether the time set on the timer has been reached (step S056). If the set time has been reached (YES in step S056), the heating controller 30 switches the heating unit 25 into the post-charge heating state and starts heating control (step S057). Then, this control process is stopped.

Thus, in this embodiment, even after completion of charging, the charging connector 8 can be heated based on an instruction input from the input unit 27 as required by the user. The charging connector 8 in a frozen state can thus be thawed and removed smoothly.

Figure 14:
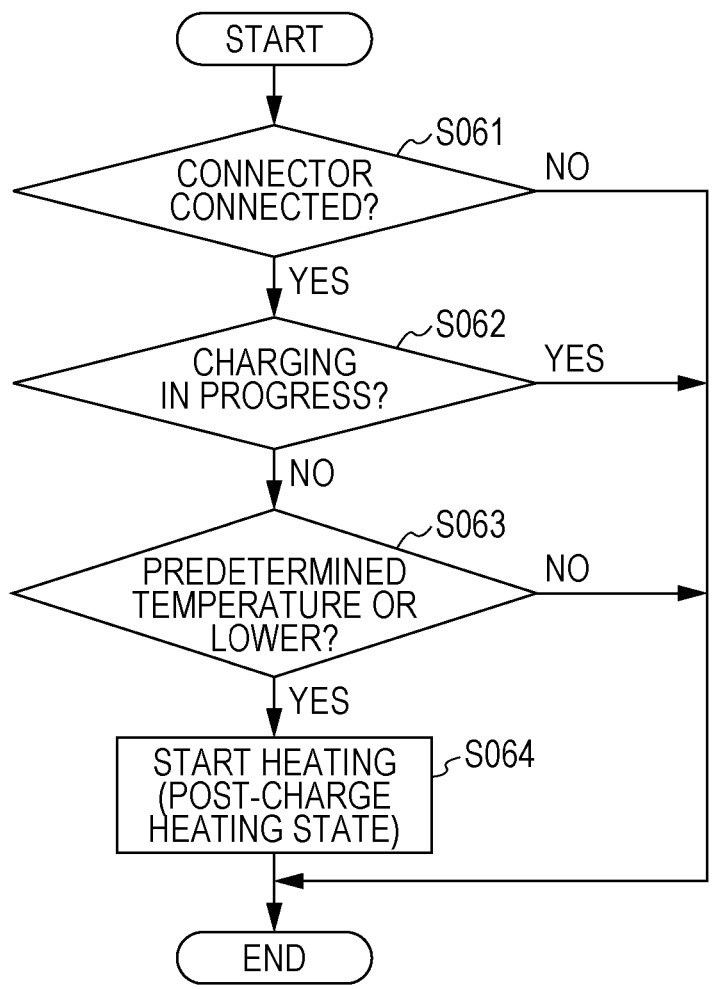
FIG. 14 is a flowchart illustrating an operation in which whether a heating condition is met is determined on the basis only of a detected temperature, according to another embodiment of the present invention.
Figure 15:
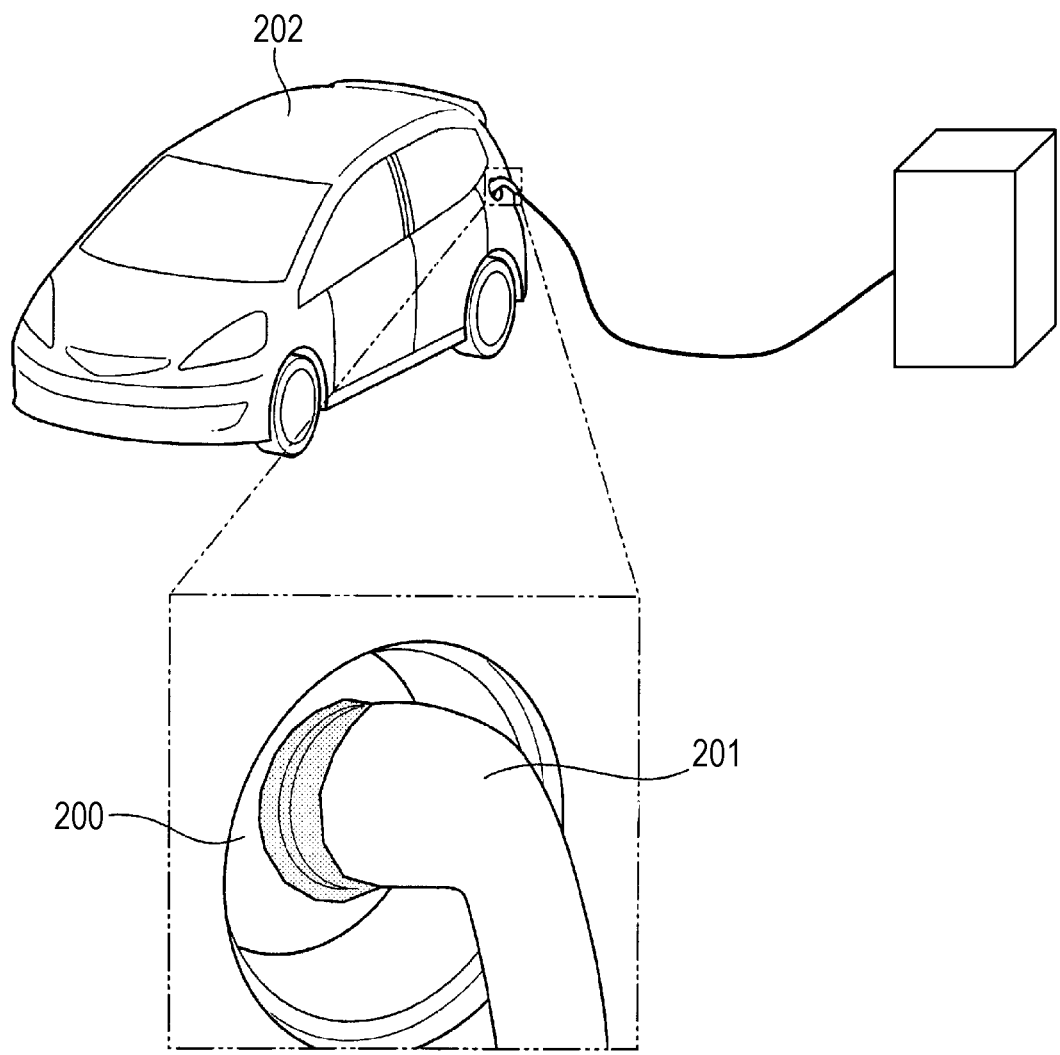
FIG. 15 illustrates a frozen portion of a charging connector of related art.

FIG. 14 is a flowchart illustrating a process in which whether a heating condition is met is determined on the basis only of a result of detection made by the temperature sensor 26. That is, the embodiment illustrated in FIG. 14 is one in which the human body sensor 29 described in the first embodiment is omitted.

First, based on a result of detection made by the state determining unit 31 of the charger main body 5, a determination is made as to whether the charging connector 8 has been connected to (or engaged with) the receiving port 11 of the electric vehicle 3 (step S061). If the charging connector 8 has not been connected to the receiving port 11 (NO in step S061), this control process is stopped. On the other hand, if it is detected that the charging connector 8 has been connected to the receiving port 11 (YES in step S061), a determination is made, based on a result of detection made by the state determining unit 31, as to whether charging of the battery 4 is in progress (step S062). If it is determined that charging is in progress (YES in step S062), this control process is stopped. Note that if charging is in progress, the heating unit 25 may be switched into the mid-charge heating state and may heat the charging connector 8.

On the other hand, if charging is not in progress (NO in step S062), a determination is made as to whether a temperature detected near the periphery of the charging connector 8 by the temperature sensor 26 is lower than or equal to a predetermined temperature (step S063). If the temperature detected near the periphery of the charging connector 8 is higher than the predetermined temperature (NO in step S063), it is unlikely that the charging connector 8 is frozen. Therefore, the heating unit 25 does not heat the charging connector 8 and this process is stopped. If the temperature detected near the periphery of the charging connector 8 is lower than or equal to the predetermined temperature (YES in step S063), the heating controller 30 switches the heating unit 25 into the post-charge heating state and starts heating control (step S64). Then, this control process is stopped.

Thus, in this embodiment, even when there is no instruction input to the input unit 27, if, after completion of charging of the battery 4, the temperature drops to within a temperature range where the charging connector 8 will be frozen, the heating controller 30 automatically starts to control heating performed by the heating unit 25. The charging connector 8 thus can be smoothly removed from the receiving port 11.

The present invention is not limited to the above-described and other embodiments, and various design changes can be made without departing from the gist of the present invention.

In the embodiments described above, a human body is detected from an image captured by a camera. Alternatively, any method may be used to detect a human body. For example, it is possible to determine that a human body has been detected when a temperature as high as that of a human body is detected by a noncontact thermometer.

A description has been made of the case where simply a human body is detected. However, facial recognition based on image processing may be performed in which a user's face is compared with a registered face of a user of the electric vehicle 3. In this case, only when the user of the electric vehicle 3 is identified, the state determining unit 31 determines that a heating condition is met. Thus, since the charging connector 8 can be heated only when an authorized user is present around the charger main body 5, it is possible to avoid unnecessary heating of the charging connector 8 and save energy.

Although the input unit 27 is included in the charging connector 8 in the embodiments described above, it may be included in the charger main body 5 or in the house state detector 40.

In the first embodiment described above, the temperature sensor 26 measures a temperature near the periphery of the charging connector 8. However, a temperature measured by the temperature sensor 26 may be a temperature in another place, such as an air temperature outside the interior of a vehicle. Even when the temperature sensor 26 measures such an outside air temperature, if the measured outside air temperature is lower than or equal to a sufficiently low predetermined temperature, it is possible to determine that the charging connector 8 is likely to be frozen while being connected to the receiving port 11.

Although both the house state detector 40 and the ID card 41 are provided in the second embodiment described above, only one of them may be provided. Also, in the description above, a determination based on user information from the ID card 41 as to whether a heating condition is met is made separately from a determination based on detection information from the house state detector 40 as to whether a heating condition is met. Alternatively, it is possible to determine that a heating condition is met when user information from the ID card 41 is information about a user of the electric vehicle 3 and, at the same time, when it can be predicted based on detection information from the house state detector 40 that the user has stepped out of a house. Thus, as compared to the above-described case where a determination based on user information from the ID card 41 is made separately from that based on detection information from the house state detector 40, authentication accuracy can be improved. That is, it is possible to more reliably detect that a person who has stepped out of the house is an authorized user and the user is likely to use the electric vehicle 3.

According to the embodiment of the invention, the charging connector is connected to the receiving port of the vehicle body and charging of the vehicle-mounted battery starts. Then, upon completion of the charging, the connection between the receiving port and the vehicle-mounted battery is interrupted and the flow of current is stopped. However, when the state determining unit detects the completion of charging of the vehicle-mounted battery and determines that a heating condition is met (i.e., determines that it is necessary to heat the charging connector), the heating controller switches the heating unit into the post-charge heating state and performs heating control. Even when an electrical connection between the receiving port of the vehicle body and the vehicle-mounted battery is interrupted after completion of charging, the heating unit is switched into the post-charge heating state and can heat the charging connector. Therefore, it is possible to prevent freezing of the charging connector while preventing electrical leakage and overcharging of the vehicle-mounted battery, and thus the charging connector can be smoothly removed from the receiving port.

According to the embodiment of the invention, the charger may further include an input unit configured to receive an instruction input from a user, wherein the state determining unit may determine that a heating condition is met when there is an instruction input from the input unit.

According to the embodiment of the invention, when there is an instruction input from a user through the input unit, the state determining unit may determine that a heating condition is met and the charging connector may be heated by the heating unit in the post-charge heating state. Since it is thus possible to heat the charging connector at any desired time after completion of charging, user convenience can be improved.

According to the embodiment of the invention, the charger may further include a temperature sensor (e.g., a temperature sensor 26 in the embodiment) configured to detect an outside temperature, wherein the state determining unit may determine that a heating condition is met when the outside temperature is lower than or equal to a predetermined temperature.

According to the embodiment of the invention, the charging connector can be heated by the heating unit only when the outside temperature is lower than or equal to the predetermined temperature, for example, when the outside temperature is a below-freezing temperature at which the charging connector may be frozen. It is thus possible to prevent unnecessary heating and reduce energy consumption.

According to the embodiment of the invention, the temperature sensor may detect a temperature near a periphery of the charging connector.

According to the embodiment of the invention, since the temperature sensor may detect a temperature near the periphery of the charging connector, it is possible to accurately determine the likelihood of freezing of the charging connector, and to reduce excess energy consumption.

According to the embodiment of the invention, the charger may further include a human body sensor (e.g., a human body sensor 29 in the embodiment) configured to detect a human body present therearound, wherein the state determining unit may determine that a heating condition is met when a human body has been detected by the human body sensor.

According to the embodiment of the invention, for example, when a user approaches the charger main body to get into the vehicle, the user can be detected by the human body sensor and the charging connector in a frozen state can be heated and thawed. It is thus possible to reduce heating time and prevent unnecessary heating.

According to the embodiment of the invention, the heating unit can be switched into a mid-charge heating state in which the heating unit heats the charging connector during charging of the vehicle-mounted battery; and when the state determining unit detects that charging of the vehicle-mounted battery is in progress and determines that a heating condition is met, the heating controller may switch the heating unit into the mid-charge heating state and control heating performed by the heating unit.

According to the embodiment of the invention, when a heating condition is met during charging of the vehicle-mounted battery, the heating unit can be switched into the mid-charge heating state and can heat the charging connector. Thus, regardless of whether charging is in progress or completed, it is possible to heat the charging connector when a heating condition is met.

According to the embodiment of the invention, the charging system includes a state determining terminal (e.g., an ID card 41 or a house state detector 40 in the embodiment) configured to output user information about a user or house state information about a state of a house to the state determining unit, wherein the state determining unit determines that a heating condition is met when it is determined that the user or the state of the house meets a predetermined condition.

According to the embodiment of the invention, user actions can be predicted based on user information or house state information output from the state determining terminal. Then, when the user or house state meets a predetermined condition, the state determining unit determines that a heating condition is met. Since the charging connector can thus be heated in accordance with user actions, it is possible to improve user convenience while reducing unnecessary heating.

According to the embodiment of the invention, the state determining terminal may be an identification card (e.g., an ID card 41 in the embodiment) that stores the user information; the state determining unit may determine whether the user is a user of the vehicle based on the user information output from the identification card; and the state determining unit may determine that a heating condition is met when the user is determined to be a user of the vehicle.

According to the embodiment of the invention, the state determining unit can determine, based on the user information output from the identification card serving as the state determining terminal, whether a person with the identification card is the user of the vehicle to which the charging connector is connected. The charging connector can thus be heated when the user of the vehicle uses the vehicle. At the same time, it is possible to prevent unnecessary heating that may occur when user information input is not information about the user of the vehicle.

According to the embodiment of the invention, the state determining terminal may be a house state detector (e.g., a house state detector 40 in the embodiment) that detects an open/closed state of a house door; the state determining unit may determine whether the house door has been opened; and the state determining unit may determine that a heating condition is met when the house door has been opened.

According to the embodiment of the invention, when the house door is opened, it is possible to predict that the user will step out of the house. Thus, the charging connector can be heated until the user reaches the vehicle, and can be smoothly removed from the receiving port.

Obviously, numerous modifications and variations of the present invention are possible in light of the above teachings. It is therefore to be understood that within the scope of the appended claims, the invention may be practiced otherwise than as specifically described herein.

What is claimed is:

1. A charger comprising;
a charger main body;
a charging cable having a first end portion and a second end portion opposite to the first end portion, the first end portion being connected to the charger main body;
a charging connector attached to the second end portion of the charging cable, the charging connector being able to be connected to a receiving port of a vehicle body to charge a vehicle-mounted battery through the charging connector;
a heater configured to heat the charging connector using electric power supplied through the charging cable, the heater being able to be switched into a post-charge heating state in which the heater heats the charging connector after completion of charging of the vehicle-mounted battery;
a state determining device configured to detect a charge state of the vehicle-mounted battery and to determine whether a heating condition to heat the charging connector is met; and
a heating controller configured to control heating performed by the heater based on a determination made by the state determining device, the heating controller switching the heater into the post-charge heating state and controlling heating performed by the heater when the state determining device detects that charging of the vehicle-mounted battery is completed and determines that a heating condition is met.

2. The charger according to claim 1, further comprising an input device configured to receive an instruction input from a user,
wherein the state determining device determines that a heating condition is met when there is an instruction input from the input device in accordance with the instruction input from the user.

3. The charger according to claim 1, further comprising a temperature sensor configured to detect an outside temperature,
wherein the state determining device determines that a heating condition is met when the outside temperature detected by the temperature sensor is lower than or equal to a predetermined temperature.

4. The charger according to claim 3, wherein the temperature sensor is configured to detect a temperature in a vicinity of a periphery of the charging connector.

5. The charger according to claim 1, further comprising a human body sensor configured to detect a human body present therearound,
wherein the state determining device determines that a heating condition is met when a human body has been detected by the human body sensor.

6. The charger according to claim 1,
wherein the heater can be switched into a mid-charge heating state in which the heater heats the charging connector during charging of the vehicle-mounted battery; and
wherein when the state determining device detects that charging of the vehicle-mounted battery is in progress and determines that a heating condition is met, the heating controller switches the heater into the mid-charge heating state and controls heating performed by the heater.

7. A charging system comprising the charger according to claim 1, the charging system comprising a state determining terminal configured to output user information about a user or house state information about a state of a house to the state determining device,
- wherein the state determining device determines that a heating condition is met when it is determined that the user or the state of the house meets a predetermined condition based on the user information or the house state information output from the state determining terminal.

8. The charging system according to claim 7,
- wherein the state determining terminal comprises an identification card to store the user information;
- wherein the state determining device is configured to determine whether the user is a user of the vehicle based on the user information output from the identification card; and
- wherein the state determining device determines that a heating condition is met when the user is determined to be a user of the vehicle.

9. The charging system according to claim 7,
- wherein the state determining terminal comprises a house state detector configured to detect an open/closed state of a house door;
- wherein the state determining device is configured to determine whether the house door has been opened; and
- wherein the state determining device determines that a heating condition is met when the house door has been opened.

10. The charger according to claim 2, further comprising a temperature sensor configured to detect an outside temperature,
- wherein the state determining device determines that a heating condition is met when the outside temperature detected by the temperature sensor is lower than or equal to a predetermined temperature.

11. The charger according to claim 10, wherein the temperature sensor is configured to detect a temperature in a vicinity of a periphery of the charging connector.

12. The charger according to claim 2, further comprising a human body sensor configured to detect a human body present therearound,
- wherein the state determining device determines that a heating condition is met when a human body has been detected by the human body sensor.

13. The charger according to claim 3, further comprising a human body sensor configured to detect a human body present therearound,
- wherein the state determining device determines that a heating condition is met when a human body has been detected by the human body sensor.

14. The charger according to claim 4, further comprising a human body sensor configured to detect a human body present therearound,
- wherein the state determining device determines that a heating condition is met when a human body has been detected by the human body sensor.

15. The charger according to claim 10, further comprising a human body sensor configured to detect a human body present therearound,
- wherein the state determining device determines that a heating condition is met when a human body has been detected by the human body sensor.

16. The charger according to claim 11, further comprising a human body sensor configured to detect a human body present therearound,
- wherein the state determining device determines that a heating condition is met when a human body has been detected by the human body sensor.

17. The charger according to claim 2,
- wherein the heater can be switched into a mid-charge heating state in which the heater heats the charging connector during charging of the vehicle-mounted battery; and
- wherein when the state determining device detects that charging of the vehicle-mounted battery is in progress and determines that a heating condition is met, the heating controller switches the heater into the mid-charge heating state and controls heating performed by the heater.

18. The charger according to claim 3,
- wherein the heater can be switched into a mid-charge heating state in which the heater heats the charging connector during charging of the vehicle-mounted battery; and
- wherein when the state determining device detects that charging of the vehicle-mounted battery is in progress and determines that a heating condition is met, the heating controller switches the heater into the mid-charge heating state and controls heating performed by the heater.

19. The charger according to claim 10,
- wherein the heater can be switched into a mid-charge heating state in which the heater heats the charging connector during charging of the vehicle-mounted battery; and
- wherein when the state determining device detects that charging of the vehicle-mounted battery is in progress and determines that a heating condition is met, the heating controller switches the heater into the mid-charge heating state and controls heating performed by the heater.

20. The charger according to claim 11,
- wherein the heater can be switched into a mid-charge heating state in which the heater heats the charging connector during charging of the vehicle-mounted battery; and
- wherein when the state determining device detects that charging of the vehicle-mounted battery is in progress and determines that a heating condition is met, the heating controller switches the heater into the mid-charge heating state and controls heating performed by the heater.

* * * * *